United States Patent
Lee et al.

(10) Patent No.: US 9,170,018 B2
(45) Date of Patent: Oct. 27, 2015

(54) TOP-FEEDING DOUBLE-SWIRL TYPE GASIFIER

(75) Inventors: Jin Wook Lee, Seoul (KR); Seok Woo Chung, Suwon-si (KR); Young Don Yoo, Seoul (KR); Yongseung Yun, Yongin-si (KR); Sam Ryong Park, Daejeon (KR); Gyoo Tae Kim, Daejeon (KR); Yong Il Lee, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 609 days.

(21) Appl. No.: 13/514,116

(22) PCT Filed: Dec. 10, 2010

(86) PCT No.: PCT/KR2010/008856
§ 371 (c)(1),
(2), (4) Date: Jun. 6, 2012

(87) PCT Pub. No.: WO2011/071339
PCT Pub. Date: Jun. 16, 2011

(65) Prior Publication Data
US 2012/0266538 A1 Oct. 25, 2012

(30) Foreign Application Priority Data
Dec. 10, 2009 (KR) .................. 10-2009-0122669

(51) Int. Cl.
*C10J 1/207* (2012.01)
*F23D 1/00* (2006.01)
(Continued)

(52) U.S. Cl.
CPC . *F23D 1/00* (2013.01); *C10J 3/485* (2013.01); *C10J 3/487* (2013.01); *C10J 3/506* (2013.01);
(Continued)

(58) Field of Classification Search
USPC ......... 48/61, 127.9, 127.1, 67, 71, 72, 73, 74, 48/76, 200, 201, 202, 203, 204, 199 R, 77, 48/78, 210, 212, 213
See application file for complete search history.

(56) References Cited

U.S. PATENT DOCUMENTS 2,699,384 A * 1/1955 Peery et al. .................. 48/206
4,685,404 A * 8/1987 Sheppard et al. ............ 110/265
(Continued)

FOREIGN PATENT DOCUMENTS

CN 101397598 A 4/2009
JP S60-173092 A 9/1985
(Continued)

OTHER PUBLICATIONS

Office Action, JP 2012-543026, Sep. 24, 2014.
(Continued)

*Primary Examiner* — Kaity Handal
(74) *Attorney, Agent, or Firm* — Abelman, Frayne & Schwab

(57) ABSTRACT

The present invention provides a top-feeding double-swirl type gasifier: a feed line through which pulverized coal is supplied by nitrogen; a distributor for dividing the pulverized coal supplied; a plurality of burner nozzles for supplying the pulverized coal, divided in the distributor, and an oxidizer; a pressure reactor in which the pulverized coal and the oxidizer react with each other to produce a flow of synthesis gas; and a swirl generator for imparting a swirling force to the oxidizer which is fed into the pressure reactor, the gasifier further comprising a slag cooling and storing container placed beneath the pressure reactor. Each of the burner nozzles consists of a triple tube having a circular cross section. The pulverized coal and carrier gas are supplied to the most central region of the burner nozzle, and an oxidizer is supplied to an annular region 34 surrounding the central region.

7 Claims, 2 Drawing Sheets

(51) Int. Cl.
*C10J 3/48* (2006.01)
*C10J 3/50* (2006.01)
*C10J 3/52* (2006.01)

(52) U.S. Cl.
CPC ............ *C10J 3/526* (2013.01); *C10J 2200/152* (2013.01); *C10J 2300/093* (2013.01); *C10J 2300/0906* (2013.01); *Y02E 20/18* (2013.01)

(56) References Cited

U.S. PATENT DOCUMENTS

| | | | |
|---|---|---|---|
| 4,858,538 A | | 8/1989 | Kuypers et al. |
| 2004/0261316 A1* | | 12/2004 | Weaver ............................ 48/210 |
| 2006/0242907 A1 | | 11/2006 | Sprouse et al. |
| 2008/0141913 A1 | | 6/2008 | Yows et al. |
| 2009/0291401 A1* | | 11/2009 | Nakagawa et al. ........... 431/181 |
| 2014/0227142 A1* | | 8/2014 | Chung et al. .................. 422/139 |

FOREIGN PATENT DOCUMENTS

| | | |
|---|---|---|
| JP | H5-62554 | 8/1993 |
| JP | 06-184561 A | 7/1994 |
| JP | 7076345 B2 | 8/1995 |
| JP | 10-259910 A | 9/1998 |
| WO | 2004-094568 A2 | 11/2004 |
| WO | 2008/110592 A1 | 9/2008 |

OTHER PUBLICATIONS

Office Action issued by the Chinese Patent Office dated Aug. 9, 2013.
International Search Report, PCT/KR2010/00856, Aug. 30, 2011, pp. 1-3.
Japanese Patent Application No. 2012-543026, Office Action, Sep. 24, 2014.
Japanese Patent Application No. 2012-543026, Response to Office Action.
Japanese Patent Application No. 2012-543026, Notice of Allowance, Jan. 27, 2015.

\* cited by examiner

TOP-FEEDING DOUBLE-SWIRL TYPE GASIFIER

RELATED APPLICATIONS

This application is a United States national phase application under 35 USC §371 of PCT/KR2010/08856 filed on Dec. 10, 2010, and claims the benefit under 35 USC §119 of Korean patent application number KR 10-2009-0122669 filed Dec. 10, 2009, the disclosures of which are both incorporated herein by reference in their entireties.

TECHNICAL FIELD

The present invention relates to a top-feeding double-swirl type gasifier, and more particularly to a top-feeding double-swirl type gasifier in which a fuel such as coal or heavy residual oil which is fed through a plurality of burner nozzles disposed at the upper portion of a cylindrical gasifier is gasified by reaction with an oxidizer, and if pulverized coal is used as the fuel, the flow of the oxidizer through the burner nozzles is swirled to promote the mixing of the fuel with the oxidizer, and an additional oxidizer is fed downwards into the entire upper region of the gasifier, which surrounds the burner nozzles, while it is swirled or not swirled, such that the gasification of the fuel can be promoted.

BACKGROUND ART

As is well known, new and renewable energy is a solution to fossil energy depletion problems and environmental problems, despite there being an excessively large initial investment. In this respect, in advanced industrial nations, extensive research and development of new and renewable energy have been being performed and policies for the dissemination thereof have been adopted.

According to Article 2 of the Korean Act on the promotion of the development, use and dissemination of new and renewable energy, new and renewable energy is defined as energy that is obtained as a result of having converted fossil fuels or converting renewable energy, including sunlight, water, the heat of the earth, precipitation, biological oil, gas, etc. into energy. Also, the Act stipulates 11 new and renewable energy fields, that is, 8 renewable energy fields, including sunlight, solar heat, biomass, wind force, water power, ocean energy, waste and the heat of the earth, and 3 new energy fields, including fuel cells, coal liquefied gas and heavy residual oil gas, and hydrogen gas.

Integrated gasification combined cycle (IGCC) technology is a new technology in which low-grade raw materials such as coal or heavy residual oil are subjected to incomplete combustion and gasification with limited oxygen together with water vapor in a gasifier at high temperature and high pressure to make a synthesis gas containing carbon monoxide and hydrogen as its main components, which is then subjected to a refining process and used to derive gas turbines and steam turbines, thereby generating electricity.

For example, according to US Patent Publication No. 20060242907 (entitled "Gasifier Injector"), pulverized coal is injected into a gasifier through a plurality of branched tubes placed above the gasifier, wherein each of the injection tubes are passed through a plate made of porous material, and an oxidizer is fed through the porous material. Apertures are formed in the side of the branched tubes for supplying the pulverized coal, such that a major amount of the oxidizer is fed into the surroundings of the branched tubes, and the oxidizer fed through the apertures is rapidly mixed with the pulverized coal. A minor amount of the oxidizer passes through the porous material into the gasifier and flows downward from the entire upper region of the gasifier.

In the above patent publication, in order to rapidly mix the oxidizer with the pulverized coal which is fed into the gasifier through the plurality of branched tubes, the pulverized coal feed unit is passed through the porous material, the apertures are formed in the side of the feed unit so as to supply the oxidizer therethrough, and the oxidizer flows downward from the entire region except for the pulverized coal feed unit. However, because the pulverized coal and the oxidizer all flow downward vertically, a general slagging phenomenon in which pulverized coal particles melt and flow along the wall of the gasifier hardly occur. Thus, in the above patent publication, there is difficulty in realizing a slagging gasifier. Namely, a relatively large amount of the pulverized coal particles are discharged as particulate material. Also, it is impossible to control the flow rate of both the oxidizer flowing along the inner periphery of the pulverized coal feed unit and the oxidizer flowing around the feed unit, and thus it is difficult to cope with various operating conditions, including replacing fuel and changes in the flow rates of pulverized coal and oxidizer.

As another example, US Patent Publication No. 20080141913 (entitled "Dump Cooled Gasifier") discloses a gasifier having a structure in which the wall of the gasifier comprises ceramic tubes and a gaseous or liquid coolant is allowed to flow into the ceramic tube so as to protect the inner wall of the gasifier from a high-temperature environment and high-temperature gas and slag during gasification. However, the gasification region is surrounded by the ceramic tubes made of ceramic material having weak mechanical strength, and for this reason, if the joint between the tubes is incomplete, the gasifier can be damaged in a high-temperature and high-pressure environment, thus making it difficult to stably operate the gasifier.

In most gasification technologies developed to gasify fuel such as coal or heavy residual oil into clean energy, a large-sized gasifier is used in order to complete a relatively slow gasification reaction in the gasifier. Despite this increase in the volume of the gasifier, when pulverized coal is used as fuel, it is difficult to completely convert carbon into gas.

DISCLOSURE OF INVENTION

Technical Problem

Accordingly, the present invention has been made in order to solve this problem, and it is an object of the present invention to provide a top-feeding double-swirl type gasifier wherein fuel and an oxidizer are rapidly mixed using a swirl flow in order to promote gasification by suitably controlling the flow, and if pulverized coal is used as fuel, it moves to the wall side of the gasifier because of the swirling force, such that it flows along the inner wall of the gasifier in a molten state while the carbon thereof is converted to a gaseous state, whereby the gasification of the pulverized coal is promoted by rapid mixing and the carbon-to-gas conversion on the wall surface of the gasifier is achieved, and thus the volume of the gasifier can be reduced while a higher carbon-to-gas conversion rate can be obtained.

Solution to Problem

To achieve the above object, the present invention provides a top-feeding double-swirl type gasifier comprising: a feed line through which pulverized coal is supplied by nitrogen; a distributor for dividing the pulverized coal which is fed through the feed line; a plurality of burner nozzles for supplying the pulverized coal, divided in the distributor, and an oxidizer; a pressure reactor in which the pulverized coal and the oxidizer react with each other to produce a synthesis gas; and a swirl generator for imparting a swirling force to the oxidizer that is fed into the pressure reactor; the gasifier further comprising a slag cooling and storing container containing water which is placed beneath the pressure reactor.

In the present invention, each of the burner nozzles consists of a triple tube having a circular cross section, the triple tube comprising a central region and an annular region surrounding the central region, in which the pulverized coal and a carrier gas are supplied to the central region, and the oxidizer consisting of oxygen or a mixed gas of oxygen and water vapor is supplied to the annular region. Also, cooling water circulates through an annular region outside the annular region surrounding the central region, and the swirl generator is provided at the annular region of each burner nozzle, to which the oxidizer is supplied.

Also, a porous plate made of porous material is disposed at the uppermost portion of the pressure reactor such that an additional oxidizer is supplied. Each of the burner nozzles is passed through the porous plate.

In the present invention, if the wall of the pressure reactor consists of a membrane-tube type wall, the surface of the wall may be coated with a ceramic material or a refractory material.

Advantageous Effects of Invention

According to the present invention, the oxidizer is imparted with a swirling force while it passes through the swirl generator disposed at the annular region surrounding the fuel, thereby promoting the mixing of the fuel with the oxidizer, unlike the prior art in which all flows, including that of fuel, an oxidizer which supplied from the periphery of the fuel feed line, and an oxidizer which is fed from the entire upper region of the gasifier, are flows that flow linearly and downwards. Also, in the gasifier according to the present invention, a portion of the oxidizer is fed downward from the entire upper portion of the gasifier, which surrounds the burner nozzles, while it is swirled or not swirled, such that the gasification of the fuel can be promoted and achieved within a short time, and thus the volume of the gasifier can be reduced, leading to a reduction in the manufacture cost of the gasifier.

Also, if the gasifier employs solid-state pulverized coal, which is most frequently used as fuel for gasification, liquid slag resulting from melting of the pulverized coal particles flows along the wall surface of the gasifier, and thus it has a much long residual time compared to a slag that flows together with gas as in the prior art. Accordingly, the gasifier according to the present invention has the effect of increasing the conversion of the carbon of pulverized coal to gas.

In addition, the pulverized coal particles are discharged as particulate matter which can be processed into a slag aggregate and marketed as a byproduct, unlike the prior art where the treatment of discharged pulverized coal particles is expensive. Thus, the gasifier according to the present invention can ensure economic efficiency.

BRIEF DESCRIPTION OF DRAWINGS

The above and other objects, features and advantages of the present invention will be more clearly understood from the following detailed description taken in conjunction with the accompanying drawings, in which.

BEST MODE FOR CARRYING OUT THE INVENTION

Hereinafter, an embodiment of the present invention will be described in further detail with reference to the accompanying drawings.

Figure 1:
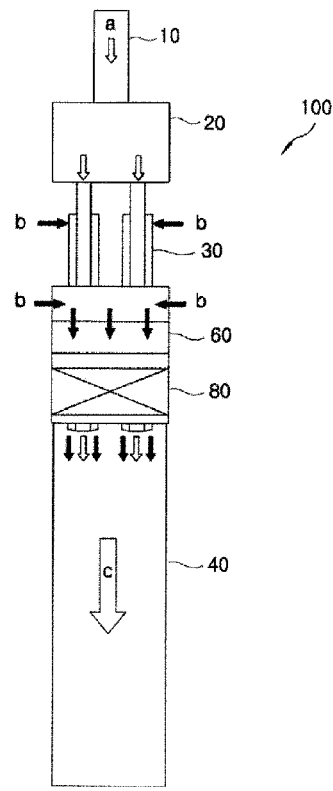
FIG. 1 is a schematic diagram showing the structure of a gasifier according to the present invention.
Figure 5:
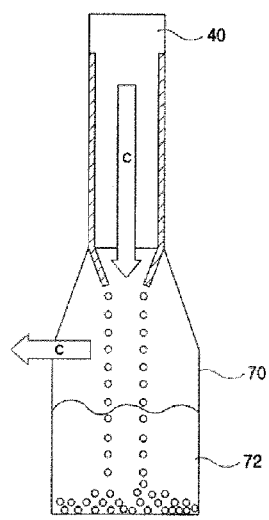
FIG. 5 is a conceptual view showing the flow of a slag and the rapid cooling and storage of the slag.

FIG. 1 shows the structure of a gasifier according to the present invention. As shown therein, a gasifier 100 of the present invention comprises: a feed line 10 through which pulverized coal is supplied by nitrogen in the direction of the arrow "a"; a distributor 20 for dividing the pulverized coal supplied through the feed line 10; a plurality of burner nozzles 30 for supplying the pulverized coal divided in the distributor 20, and an oxidizer in the direction of the arrow "b"; a pressure reactor 40 in which the pulverized coal and the oxidizer react with each other to produce a flow of synthesis gas (arrow "c"); and a swirl generator 80 (or 50 in FIG. 3) for imparting a swirling force to the oxidizer which is supplied into the pressure reactor 40, the gasifier 100 further comprising a slag cooling and storing container 70 (FIG. 5) beneath the pressure reactor 40.

Each of the burner nozzles 30 for supplying the pulverized coal and the oxidizer consists of a triple tube having a circular cross section, wherein the pulverized coal and carrier gas are supplied to the most central region 32 of the burner nozzle 30. An oxidizer is supplied to an annular region 34 surrounding the central region 32, and it may be oxygen or a mixed gas of oxygen and water vapor.

Figure 2:
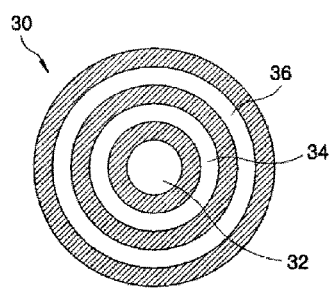
FIG. 2 is a conceptual view of a nozzle for feeding pulverized coal and an oxidizer.

As shown in FIG. 2 showing the triple tube configuration of the burner nozzle, cooling water circulates through the outermost annular region 36 of the triple tube to prevent heating of the portion to which the pulverized coal and the oxidizer were supplied. The plurality of burner nozzles 30, which consist of the triple tubes as described above and serve to supply the pulverized coal and the oxidizer, communicate with the inside of the pressure reactor 40.

Figure 3:
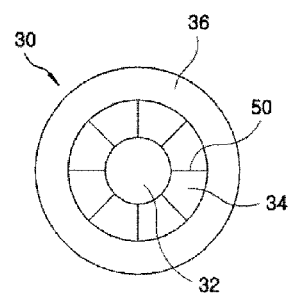
FIG. 3 is a conceptual view showing the configuration of a swirl generator provided in an annular region to which an oxidizer is supplied.

FIG. 3 shows a swirl generator which is used as a means for imparting a swirling force, provided in the annular region 34 to which the oxidizer is supplied and which surrounds the central region 32 to which the pulverized coal is supplied. As shown in FIG. 3, the swirl generator 50 is provided at the outlet portion of the annular region 34 of the triple tube, such that the oxidizer finally comes out of the burner nozzles 30 while it has a strong swirling force.

At the uppermost portion of the pressure reactor 40 to which the triple tubes extend downward, a porous plate 60 made of porous material is provided. To the upper portion of the porous plate 60 placed at the top of the pressure reactor 40, an additional oxidizer is supplied in the direction of an arrow "b". Below the porous plate 60, an additional swirl generator 80 which imparts an additional swirling force is provided such that it imparts a swirling force to the additional oxidizer which is supplied to the upper portion of the porous plate and flows to the pressure reactor 40. However, depending on the properties of fuel or the operating conditions for gasification, the swirl generator that imparts a swirling force to the additional oxidizer passing through the porous plate may also not be provided. As described above, the porous plate 60 and the swirl generator 80 are provided in the pressure reactor 40, and the plurality of burner nozzles 30 communicate with the inside of the pressure reactor 40 through the porous plate 60 and the swirl generator 80.

Figure 4:
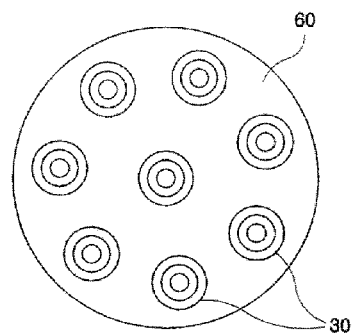
FIG. 4 is a conceptual view showing the configuration of a plurality of burner nozzles disposed at the upper portion of the gasifier.

Thus, as shown in FIG. 4, pulverized coal and a carrier gas are fed into the top of the pressure reactor 40 through the central region 32 of the burner nozzles 30, and an additional oxidizer is fed into the entire upper portion of the gasifier, which surrounds the plurality of burner nozzles 30. Thus, the flow rate of the oxidizer which is fed into the gasifier can be independently controlled.

Pulverized coal is fed into the pressure reactor 40 as described above and reacts with the oxidizer in the reactor to produce a synthesis gas containing CO and $H_2$ as its main components. At this time, ash contained in the pulverized coal particles moves toward the wall of the pressure reactor 40 due to a centrifugal force created by a double swirling effect, and the resulting molten slag flows downwards traveling along a refractory material (indicated by slant lines in FIG. 5) provided on the wall surface of the reactor 40. Then, the slag flow falls into a slag cooling and storing container 70 placed beneath the pressure reactor 40. Because the container 70 contains cooling water 72, the slag which has fallen into the container 70 rapidly cools and solidifies. If the wall of the pressure reactor (gasification region) 40 consists of a membrane-tube type wall in which a coolant flows in the tubes and the membrane connects the tubes with each other, the membrane-tube type wall may be coated or may not coated with a refractory material depending on the properties of fuel or the operating conditions of gasification. If the refractory material is coated on the wall, the refractory material may be a general refractory material or a ceramic material.

As described above, according to the present invention, because pulverized coal is fed into the pressure reactor 40 through the plurality of burner nozzles 30, the uniformity of the flow, the slagging property of the pulverized coal particles, and the uniformity of the distribution of the pulverized coal particles can be improved upon, thereby improving the gasification of the pulverized coal. As a result, rapid gasification of the pulverized coal is induced, and thus the volume of the gasifier can be reduced, and the gasifier's performance such as carbon-to-gas conversion and cold gas efficiency can be improved.

The effect of the present invention was scientifically examined by simple computational analysis, and the results of the analysis are shown in Tables 1 and 2 below and FIG. 6. The numerical value in Table 1 is a factor indicating the uniformity of flow, and if the numerical value is zero, it indicates that the flow is ideally completely uniform. As can be seen from the numerical values in Table 1, in the case of the present invention in which the fuel and the oxidizer are more rapidly mixed in the form of a double swirl, the flow is ideally more uniform compared to the case of the prior art wherein the fuel and the oxidizer are linearly fed. Table 2 below shows the impingement of pulverized coal particles on the wall of the pressure reactor, which has a direct connection with the slagging property of the coal particles. As can be seen in Table 2, a larger amount of the pulverized coal particles impinges on the wall of the gasifier of the present invention.

TABLE 1

Comparison of flow uniformity between the prior art and the present invention

| Deviation | Prior art (linear feeding) | Invention (double swirl) |
|---|---|---|
| Z = 0.2 | 86.7% | 58.20% |
| Z = 0.4 | 45.90% | 31.30% |
| Z = 0.6 | 34.60% | 24.30% |

TABLE 2

Comparison of the rate of particle movement to the gasifier wall between the prior art and the present invention

| Movement direction of particles | Prior art (linear feeding) | Invention (double swirl) |
|---|---|---|
| Wall of gasifier | 41.00% | 62.90% |

Figure 6:
FIG. 6 shows a comparison of the distribution of pulverized coal particles between the prior art and the present invention.

Meanwhile, FIG. 6 shows the planar distribution of pulverized coal particles. As can be seen therein, the distribution of pulverized coal particles in the gasifier according to the present invention (shown in the right side of FIG. 6) is more uniform than the distribution of pulverized coal particles in the gasifier according to the prior art (shown in the left side of FIG. 6). Such results produced by computational analysis directly indicate that the effect of the gasifier according to the present invention is better than the effect of the prior-art gasifier.

Although the preferred embodiment of the present invention has been described for illustrative purposes, those skilled in the art will appreciate that various modifications, additions and substitutions are possible, without departing from the scope and spirit of the invention as disclosed in the accompanying claims.

The invention claimed is:

1. A top-feeding double-swirl type gasifier for producing synthesis gas comprising:
    a feed line through which pulverized coal is supplied by nitrogen;
    a distributor for dividing the pulverized coal which is fed through the feed line;
    a plurality of burner nozzles for supplying the pulverized coal, divided in the distributor, and an oxidizer, to a pressure reactor;
    a swirl generator for imparting a swirling force to the oxidizer that is fed into the pressure reactor;
    a porous plate made of porous material disposed at the uppermost portion of the pressure reactor such that an additional oxidizer is supplied;
    an additional swirl generator, which is provided below the porous plate, for imparting an additional swirl force; and
    a slag storing container placed beneath the pressure reactor.

2. The gasifier of claim 1,
    wherein the slag storing container is a slag cooling and storing container containing water.

3. The gasifier of claim 1,
    wherein each of the burner nozzles consists of a triple tube having a circular cross section, the triple tube comprising a central region and an annular region surrounding the central region, in which the pulverized coal and a carrier gas are supplied to the central region, and the oxidizer consisting of oxygen or a mixed gas of oxygen and water vapor is supplied to the annular region.

4. The gasifier of claim 3,
wherein cooling water circulates through an annular region outside the annular region surrounding the central region.

5. The gasifier of claim 3,
wherein the swirl generator is provided in the annular region of each burner nozzle.

6. The gasifier of claim 1,
wherein each of the burner nozzles is passed through the porous plate.

7. The gasifier of claim 1,
wherein the pressure reactor has a membrane-tube type wall, the surface of which is coated with a ceramic material or a refractory material.

* * * * *